(12) United States Patent
Chiu et al.

(10) Patent No.: US 11,411,977 B2
(45) Date of Patent: *Aug. 9, 2022

(54) SYSTEMS AND METHODS FOR PROVIDING CYBERSECURITY ANALYSIS BASED ON OPERATIONAL TECHNOLOGIES AND INFORMATION TECHNOLOGIES

(71) Applicant: C3.ai, Inc., Redwood City, CA (US)

(72) Inventors: Kuenley Chiu, San Francisco, CA (US); Jeremy Kolter, Pittsburgh, PA (US); Nikhil Krishnan, Los Altos, CA (US); Henrik Ohlsson, San Francisco, CA (US)

(73) Assignee: C3.AI, INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/891,630

(22) Filed: Feb. 8, 2018

(65) Prior Publication Data
US 2019/0052662 A1 Feb. 14, 2019

Related U.S. Application Data

(63) Continuation of application No. 14/728,932, filed on Jun. 2, 2015, now Pat. No. 9,923,915.

(51) Int. Cl.
*H04L 9/40* (2022.01)
*G06Q 10/06* (2012.01)
(Continued)

(52) U.S. Cl.
CPC ........ *H04L 63/1433* (2013.01); *G06F 21/577* (2013.01); *G06N 20/00* (2019.01);
(Continued)

(58) Field of Classification Search
CPC ............ H04L 63/1433; H04L 63/1425; G06Q 10/0635; G06Q 50/06
See application file for complete search history.

(56) References Cited

U.S. PATENT DOCUMENTS 7,739,082 B2 * 6/2010 Scherrer ............. H04L 63/1425
703/2
7,747,494 B1 6/2010 Kothari et al.
(Continued)

FOREIGN PATENT DOCUMENTS

CN 102801732 A 11/2012
CN 103716177 A 4/2014
(Continued)

OTHER PUBLICATIONS

International search report and written opinion dated Sep. 26, 2016 for PCT Application No. PCT/US2016/035556.
(Continued)

*Primary Examiner* — Zachary A. Davis
(74) *Attorney, Agent, or Firm* — Wilson Sonsini Goodrich & Rosati

(57) ABSTRACT

The disclosed technology can acquire a first set of data from a first group of data sources including a plurality of network components within an energy delivery network. A first metric indicating a likelihood that a particular network component, from the plurality of network components, is affected by cyber vulnerabilities can be generated based on the first set of data. A second set of data can be acquired from a second group of data sources including a collection of services associated with the energy delivery network. A second metric indicating a calculated impact on at least a portion of the energy delivery network when the cyber vulnerabilities affect the particular network component can be generated based on the second set of data. A third metric indicating an overall level of cybersecurity risk associated with the particular network component can be generated based on the first metric and the second metric.

19 Claims, 13 Drawing Sheets

(51) Int. Cl.
*G06F 21/57* (2013.01)
*G06Q 50/06* (2012.01)
*G06N 20/00* (2019.01)

(52) U.S. Cl.
CPC ..... *G06Q 10/0635* (2013.01); *H04L 63/1408* (2013.01); *H04L 63/1425* (2013.01); *H04L 63/20* (2013.01); *G06Q 50/06* (2013.01); *H04L 63/101* (2013.01)

(56) References Cited

U.S. PATENT DOCUMENTS

| | | | | |
|---|---|---|---|---|
| 8,126,804 | B2 * | 2/2012 | Huang | G06N 7/08 |
| | | | | 705/38 |
| 8,762,188 | B2 * | 6/2014 | Abercrombie | G06Q 10/04 |
| | | | | 705/7.11 |
| 8,769,412 | B2 * | 7/2014 | Gill | G06F 21/55 |
| | | | | 715/736 |
| 8,856,936 | B2 * | 10/2014 | Datta Ray | H04L 63/1433 |
| | | | | 726/25 |
| 8,984,643 | B1 | 3/2015 | Krisher et al. | |
| 9,104,886 | B1 * | 8/2015 | Dolbakian | G06F 21/62 |
| 9,294,498 | B1 * | 3/2016 | Yampolskiy | H04L 63/1433 |
| 9,386,041 | B2 * | 7/2016 | Carver | H04L 63/1441 |
| 9,401,924 | B2 * | 7/2016 | Ge | H04L 63/1425 |
| 9,866,578 | B2 * | 1/2018 | Moore | H04L 63/1433 |
| 9,923,915 | B2 * | 3/2018 | Chiu | H04L 63/1433 |
| 2006/0034305 | A1 * | 2/2006 | Heimerdinger | H04L 63/1408 |
| | | | | 370/408 |
| 2007/0245420 | A1 * | 10/2007 | Yong | H04L 43/00 |
| | | | | 726/23 |
| 2013/0086635 | A1 | 4/2013 | Hershey et al. | |
| 2013/0191919 | A1 | 7/2013 | Basavapatna et al. | |
| 2013/0282314 | A1 * | 10/2013 | Budhraja | H02J 3/008 |
| | | | | 702/60 |
| 2014/0137257 | A1 * | 5/2014 | Martinez | H04L 63/1433 |
| | | | | 726/25 |
| 2015/0215334 | A1 * | 7/2015 | Bingham | G06N 20/00 |
| | | | | 726/23 |
| 2016/0065594 | A1 * | 3/2016 | Srivastava | H04L 63/1433 |
| | | | | 726/23 |

FOREIGN PATENT DOCUMENTS

| | | |
|---|---|---|
| CN | 103905450 A | 7/2014 |
| JP | 2002328893 A | 11/2002 |
| JP | 2008278272 A | 11/2008 |
| JP | 2012524936 A | 10/2012 |
| JP | 2014503099 A | 2/2014 |
| WO | WO-2015070466 A1 | 5/2015 |
| WO | WO-2016196820 A1 | 12/2016 |

OTHER PUBLICATIONS

Office Action dated Jun. 5, 2017 for U.S. Appl. No. 14/728,932.
U.S. Appl. No. 14/728,932 Notice of Allowance dated Jan. 22, 2018.
EP16804456.8 Extended European Search Report dated Dec. 17, 2018.
EP20166975.1 Extended European Search Report dated May 25, 2020.

* cited by examiner

600

```
Acquire a first set of data from a first group of data sources including a plurality of network
components within an energy delivery network
602
                                    ↓
Generate, based on the first set of data, a first metric indicating a likelihood that a particular
network component is affected by cyber vulnerabilities
604
                                    ↓
Acquire a second set of data from a second group of data sources including a collection of
services associated with the energy delivery network
606
                                    ↓
Generate, based on the second set of data, a second metric indicating a calculated impact to the
energy delivery network when the cyber vulnerabilities affect the particular network component
608
                                    ↓
Generate, based on the first metric and the second metric, a third metric indicating an overall level
of cybersecurity risk associated with the particular network component
610
```

```
┌─────────────────────────────────────────────────────────────────────────────┐
│ Generate a plurality of third metrics including the third metric indicating │
│ the overall level of cybersecurity risk associated with the particular       │
│ network component                                                            │
│                                    702                                       │
└─────────────────────────────────────────────────────────────────────────────┘
                                     │
                                     ▼
┌─────────────────────────────────────────────────────────────────────────────┐
│ Rank the plurality of network components based on the plurality of third    │
│ metrics to produce a ranked list of network components                       │
│                                    704                                       │
└─────────────────────────────────────────────────────────────────────────────┘
                                     │
                                     ▼
┌─────────────────────────────────────────────────────────────────────────────┐
│ Provide at least a portion of the ranked list of network components to an   │
│ energy provider that utilizes the energy delivery network                    │
│                                    706                                       │
└─────────────────────────────────────────────────────────────────────────────┘
```

FIGURE 7A

750
Apply a first weight value to the first metric to produce a first weighted metric
752
Apply a second weight value to the second metric to produce a second weighted metric
754
Combine the first weighted metric and the second weighted metric to produce the third metric
756
FIGURE 7B

SYSTEMS AND METHODS FOR PROVIDING CYBERSECURITY ANALYSIS BASED ON OPERATIONAL TECHNOLOGIES AND INFORMATION TECHNOLOGIES

CROSS-REFERENCE

This application is a Continuation of U.S. patent application Ser. No. 14/728,932, filed Jun. 2, 2015, which is entirely incorporated herein by reference.

FIELD OF THE INVENTION

The present technology relates to the field of energy management. More particularly, the present technology discloses techniques for providing cybersecurity analysis based at least in part on operational technologies and information technologies.

BACKGROUND

Resource consumption touches every aspect of life. Resources are consumed for a wide variety of purposes every day. In some cases, energy is consumed in order to provide power to various components or to enable various devices or systems to function. In one example, energy in the form of electricity is consumed to enable the operations of computing devices or computing systems, appliances, air conditioners, and many other components, entities, devices, systems, or services. In another example, energy in the form of natural gas is consumed to enable gas space heaters, gas water heaters, gas stoves, and other components, entities, devices, systems, or services to function.

Due to significant amounts of energy being consumed every day, it can be beneficial to provide tools or services for evaluating energy usage and ensuring that energy is being provided appropriately and continuously without interruption. In some instances, one or more components of an energy delivery network can be vulnerable or open to attack by various cyber threats, such as virus, malware, and hackers. Conventional approaches to evaluating and providing security for energy delivery can often times be insufficient, ineffective, or otherwise lacking. Moreover, in many cases, conventional approaches to energy observation, tracking, and protection do not provide adequate information or other resources to efficiently resolve various cyber issues. Accordingly, such concerns associated with conventional approaches can create challenges for and worsen the overall experience associated with energy delivery and consumption.

SUMMARY

Various embodiments of the present disclosure can include systems, methods, and non-transitory computer readable media that are configured to acquire a first set of data from a first group of data sources including a plurality of network components within an energy delivery network. A first metric indicating a likelihood that a particular network component, from the plurality of network components, is affected by one or more cyber vulnerabilities can be generated based on the first set of data. A second set of data can be acquired from a second group of data sources including a collection of services associated with the energy delivery network. A second metric indicating a calculated impact to at least a portion of the energy delivery network when the one or more cyber vulnerabilities affect the particular network component can be generated based on the second set of data. A third metric indicating an overall level of cybersecurity risk associated with the particular network component can be generated based on the first metric and the second metric.

In an embodiment, a plurality of third metrics including the third metric indicating the overall level of cybersecurity risk associated with the particular network component can be generated. Each third metric in the plurality of third metrics can indicate a respective overall level of cybersecurity risk associated with a respective network component in the plurality of network components. The plurality of network components can be ranked based on the plurality of third metrics to produce a ranked list of network components. At least a portion of the ranked list of network components can be provided to an energy provider that utilizes the energy delivery network.

In an embodiment, a set of visualizations for a set of network components identified in the ranked list of network components can be generated. Each visualization in the set of visualizations can represent a corresponding network component in the set of network components. Each visualization can be presented in association with a particular color determined based on at least one of a ranking for the corresponding network component or a corresponding overall level of cybersecurity risk associated with the corresponding network component.

In an embodiment, generating the third metric can further comprise applying a first weight value to the first metric to produce a first weighted metric. A second weight value can be applied to the second metric to produce a second weighted metric. The first weighted metric and the second weighted metric can be combined to produce the third metric.

In an embodiment, the first set of data can be acquired using at least a portion of a network cybersecurity service. The second set of data can be acquired using at least a portion of an energy management platform.

In an embodiment, the first set of data can be associated with detected network traffic within the energy delivery network. Generating the first metric can include analyzing the detected network traffic.

In an embodiment, analyzing the detected network traffic can include utilizing at least one of a syntax indicator, a computed indicator, or an advanced behavioral indicator. The likelihood that the particular network component is affected by the one or more cyber vulnerabilities can be calculated based on the at least one of the syntax indicator, the computed indicator, or the advanced behavioral indicator.

In an embodiment, the syntax indicator can be based on analysis of at least one of an Internet Protocol (IP) address associated with the detected network traffic or an email address associated with the detected network traffic.

In an embodiment, the computed indicator can be based on analysis of at least one of a message-digest algorithm hash value associated with the detected network traffic or a regular expression associated with the detected network traffic.

In an embodiment, the advanced behavioral indicator can be based on analysis of at least one of a multiple-step series of activities associated with the detected network traffic or a combination of multiple indicators associated with the detected network traffic.

In an embodiment, the second set of data can be associated with at least one of customer data relating to the energy delivery network, operations data relating to the energy delivery network, or economic data relating to the energy delivery network. Generating the second metric can include analyzing the at least one of the customer data, the operations data, or the economic data.

In an embodiment, the customer data can be associated with at least one of a customer count, an issue resolution time, a reliability index, or a customer criticality metric. The operations data can be associated with at least one of a labor cost, a materials cost, a physical damage likelihood metric, or a degree of redundancy. The economic data can be associated with at least one of an energy delivery cost, an equipment cost, or a regulatory penalty.

In an embodiment, at least some network components in the plurality of network components can be associated with operational technology. At least some services in the collection of services can be associated with information technology.

In an embodiment, the plurality of network components can include at least one of a router, a switch, a server, a firewall, a transformer, an energy distribution component, an energy transmission component, an energy generation component, or an energy delivery substation.

In an embodiment, the first group of data sources can further include at least one of a supervisory control and data acquisition (SCADA) command and control service, an enterprise firewall service, a log service, an intrusion prevention service, a security information and event management service (SIEM), or an intrusion protection service.

In an embodiment, the collection of services can include at least one of a phone service, a meter data management service, a customer information service, a geographic information service, a work management service, an enterprise asset management service, a smart meter head end service, an energy management service, a demand management service, an outage management service, a customer care and billing service, an enterprise communications service, or a threat and vulnerability detection library service.

In an embodiment, the third metric can be generated based on utilizing one or more machine learning processes to determine how the first metric and the second metric are to be combined to produce the third metric.

In an embodiment, the energy delivery network can include at least one of an electricity delivery network, an oil delivery network, or a gas delivery network.

Many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 6 illustrates an example method associated with providing cybersecurity analysis based on operational technologies and information technologies, in accordance with an embodiment of the present disclosure.

FIG. 7A illustrates an example method associated with providing cybersecurity analysis based on operational technologies and information technologies, in accordance with an embodiment of the present disclosure.

FIG. 7B illustrates an example method associated with providing cybersecurity analysis based on operational technologies and information technologies, in accordance with an embodiment of the present disclosure.

Figure 1:
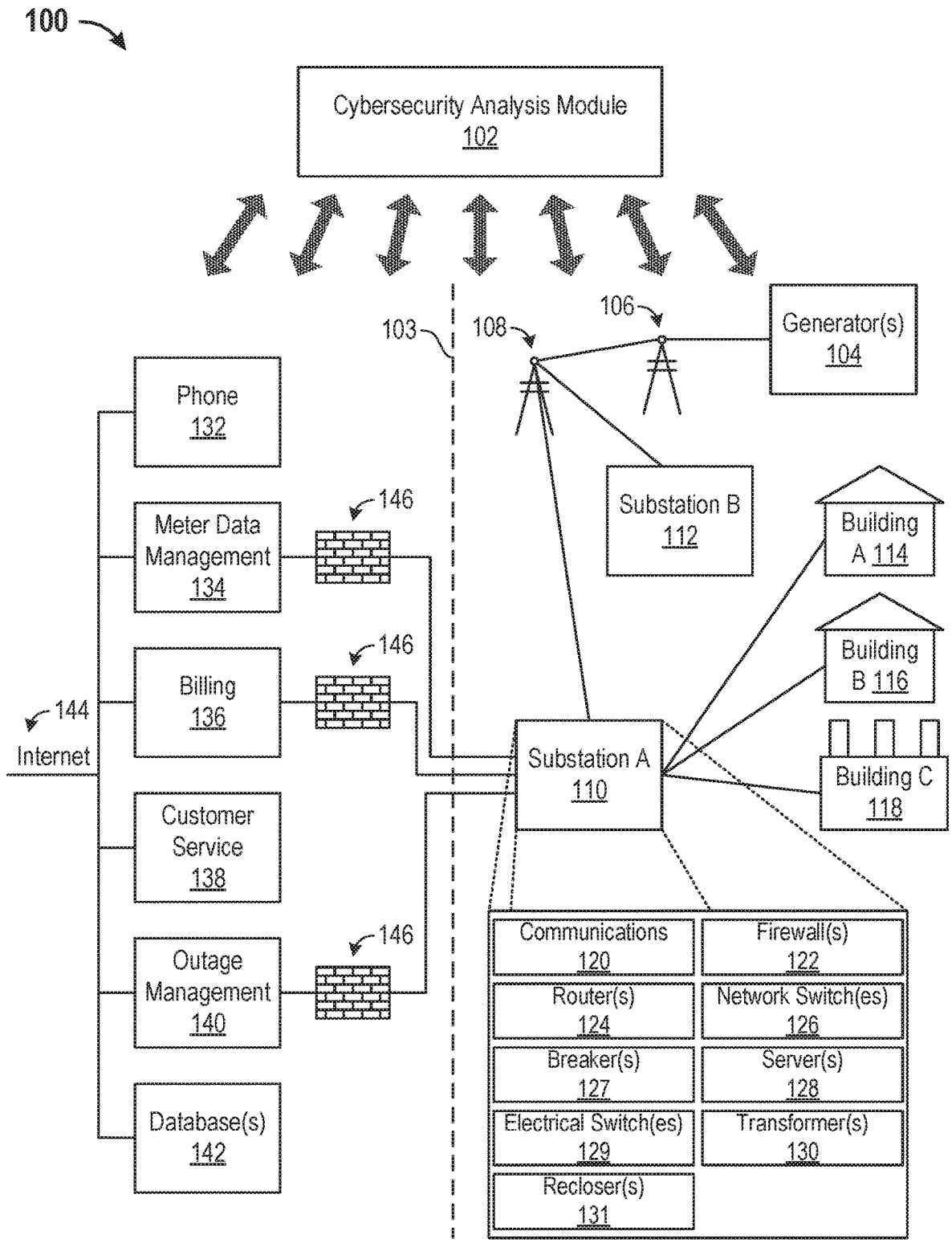
FIG. 1 illustrates an example scenario in which cybersecurity analysis can be provided for operational technologies and information technologies, in accordance with an embodiment of the present disclosure.

The figures depict various embodiments of the present disclosure for purposes of illustration only, wherein the figures use like reference numerals to identify like elements. One skilled in the art will readily recognize from the following discussion that alternative embodiments of the structures and methods illustrated in the figures may be employed without departing from the principles of the disclosed technology described herein.

DETAILED DESCRIPTION

Resources, such as energy, are consumed or used every day for a wide variety of purposes. In one example, consumers can use energy in the form of natural gas to power various appliances at home and businesses can use natural gas to operate various machinery. In another example, consumers and businesses can use energy in the form of electricity to power various electronic appliances and other electrical components, devices, or systems.

Energy consumption is facilitated by energy providers who supply energy to meet demand. Energy providers, such as utility companies, can provide one or more forms of energy, such as natural gas, oil, gasoline, electricity, etc. In some cases, energy providers can utilize energy delivery networks or systems to provide energy to their intended customers (i.e., users). In exchange, the energy providers can bill their customers for the energy consumed. Customers have to pay their energy bills if they wish to continue using the provided energy.

An energy delivery network (or system, service, etc.) can often times include an operational technology (OT) portion and an information technology (IT) portion. In general, operational technologies perform various tasks and activities to enable energy to be physically delivered to the customers. For example, the operational technology portion can correspond to an electric grid, including hardware and software components, configured to facilitate physical delivery and/or transmission of electricity to customers. Moreover, the information technology portion of the energy delivery network can sometimes be referred to as the enterprise portion of the energy delivery network. Information technologies can provide one or more services or systems enabling the energy provider to manage energy delivery, provide customer service, communicate with customers, and/or perform other tasks. For instance, information technologies can include a billing service or system that records which customers are to be billed and for how much money.

In some cases, one or more services and/or systems of information technologies can communicate with one or more components and/or systems of operational technologies. Furthermore, information technologies can connect to public networks, such as the internet. As such, in some instances, information technologies and operational technologies can be vulnerable to viruses, malware, hackers, errors, inadvertent/mistaken operation, and/or other cyber threats. However, conventional approaches are generally lacking in providing evaluation and protection measures for information technologies and operational technologies. Moreover, under conventional approaches, energy providers often face difficulty in determining how to resolve cybersecurity issues. Due to these and other reasons, conventional approaches can be insufficient, problematic, and inefficient. Accordingly, an improved approach to providing cybersecurity measures for energy delivery networks can be advantageous.

Various embodiments of the present disclosure can provide cybersecurity analysis based on (i.e., based at least in part on) operational technologies and information technologies. Systems, methods, and non-transitory computer readable media of the disclosed technology can be configured to acquire a first set of data from a first group of data sources including a plurality of network components within an energy delivery network. A first metric indicating a likelihood that a particular network component, from the plurality of network components, is affected (i.e., is currently affected, has been affected, may be affected, and/or will be affected, etc.) by one or more cyber vulnerabilities can be generated based on the first set of data. A second set of data can be acquired from a second group of data sources including a collection of services associated with the energy delivery network. A second metric indicating a calculated impact to at least a portion of the energy delivery network when the one or more cyber vulnerabilities affect the particular network component can be generated based on the second set of data. A third metric indicating an overall level of cybersecurity risk associated with the particular network component can be generated based on the first metric and the second metric. It is contemplated that there can be many variations and/or other possibilities. For instance, there can be many variations for generating the third metric based on one or more combinations or calculations utilizing the first metric and the second metric.

FIG. 1 illustrates an example scenario 100 in which cybersecurity analysis can be provided for operational technologies and information technologies, in accordance with an embodiment of the present disclosure. It should be understood that all examples herein are provided for illustrative purposes and that many variations are possible. In the example scenario 100, an example cybersecurity analysis module 102 can be configured to acquire data from operational technologies and information technologies in an energy delivery network or system. Based on the acquired data, the cybersecurity analysis module 102 can facilitate providing cybersecurity analysis based on operational technologies and information technologies in the energy delivery network.

As shown in the example of FIG. 1, the energy delivery network can include an information technology portion (IT) and an operational technology (OT) portion. In this example, the information technology portion can be represented as the left side of the dotted vertical line 103, while the operational technology portion can be represented as the right side of the dotted vertical line 103. As discussed previously, operational technologies of the energy delivery network can enable energy to be monitored, controlled, and/or physically delivered or provided to intended customers. Information technologies can provide various services and functions other than the physical delivery or transmission of the energy to the customers.

In the example scenario 100, operational technologies of the energy delivery network can include one or more generators 104, transmission systems 106, and distribution systems 108. Further, there can be a plurality of energy delivery substations, such as Substation A 110 and Substation B 112. Each respective substation can deliver energy to a respective group of customers. For instance, the example scenario 100 shows that Substation A 110 can provide energy to various customers, such as Building A 114, Building B 116, and Building C 118. Furthermore, each substation can include a plurality of components (or systems). Such components can include, but are not limited to, one or more communications components 120, firewalls 122, routers 124, network switches 126, servers 128, and transformers 130, breakers 127, electrical switches 129, and reclosers 131. In some cases, components such as the firewalls 122, routers 124, network switches 126, servers 128, etc. can be associated with the information technology portion while components such as the transformers 130, breakers 127, electrical switches 129, reclosers 131, etc. can be associated with the operational technology portion. These components can be configured to facilitate delivering energy to the customers. For instance, the one or more routers 124 can direct information to facilitate energy delivery. Switches such as the one or more electrical switches 129 can toggle to cause energy to be transmitted to its intended destination. The one or more transformers 130 can facilitate energy transfer between circuits, such as via induction. The one or more communications components 120, one or more servers 128, and/or control components can instruct the routers 124, switches 126, and/or transformers 130 to operate appropriately. The one or more firewalls 122 can attempt to prevent undesirable or inappropriate traffic. It should be understood that many variations are possible.

In addition, information technologies of the energy delivery network can include a collection of services or systems. Examples of the services (or systems) can include, but are not limited to, a phone system 132, a meter data management (MDM) system 134, a billing system 136, a customer service system 138, an outage management system 140, and a database(s) 142. Further, each of the information technology systems or services can be connected to a public network, such as the internet 144. Again, there can be many variations or other possibilities.

In some instances, one or more information technology services (or systems) of the energy delivery network can connect with one or more operational technology components (or systems) of the energy delivery network. In the example scenario 100, the meter data management system 134 and the billing system 136 of the information technology portion can be connected to Substation A 110 of the operational technology portion. Although not shown in this example, other information technologies can be connected to various operational technologies as well. Accordingly, operational technologies can also connect to public networks, such as by connecting to the internet 144 via information technologies. As a result, in some cases, viruses, malware, hackers, errors (e.g., typos, invalid data, etc.), or other cyber threats can negatively affect the information technologies as well as the operation technologies. In some cases, one or more firewalls 146 can be set up between information technology systems and operational technology systems. However, due to the quantity, variety, and ever-changing nature of cyber threats, such firewalls 146 are often times insufficient or inadequate to protect against potential cyber threats to information technologies and operational technologies.

As discussed above, the cybersecurity analysis module 102 can be configured to facilitate providing cybersecurity analysis based on (i.e., based at least in part on) operational technologies and information technologies in the energy delivery network. As shown in the example scenario 100, the cybersecurity analysis module 102 can request, fetch, retrieve, monitor, or otherwise acquire data from various components, services, and/or systems of the operational and information technology portions of the energy delivery network. In some implementations, the data can be acquired in (or near) real-time and/or can be acquired at various times (e.g., every day, every hour, every minute, every second, hundreds of times per second, thousands of times per second, etc.). In one example, the cybersecurity analysis module 102 can acquire or monitor firewall data which indicates whether the firewalls are experiencing unusual, abnormal, or unexpected network traffic. In another example, the cybersecurity analysis module 102 can acquire or monitor server data which indicates whether the servers are being used in an unusual, abnormal, or unexpected manner. In another example, the cybersecurity analysis module 102 can acquire or monitor transformer data which indicates whether the transformers are in an unusual, abnormal, or unexpected state. Many variations are possible.

The cybersecurity analysis module 102 can process the acquired data and provide a detailed analysis of various cybersecurity issues for the operational technologies and the information technologies. In some embodiments, the cybersecurity analysis module 102 can provide or be utilized with a control panel or dashboard that presents cybersecurity information (e.g., the detailed analysis) to an entity, such as a cybersecurity analyst or manager (or administrator) who is responsible for determining how to proceed when a multitude of cybersecurity risks are detected within the energy delivery network. The cybersecurity information or analysis can, for example, specify where the cybersecurity risks are located (e.g., where they are currently located, where they may be located in the future, etc.), who the affected customers are, where the affected customers are, and/or a list of specific items to be examined in an attempt to mitigate the cybersecurity risks, etc. More details regarding the cybersecurity analysis module 102 will be provided below with reference to FIG. 2.

Figure 2:
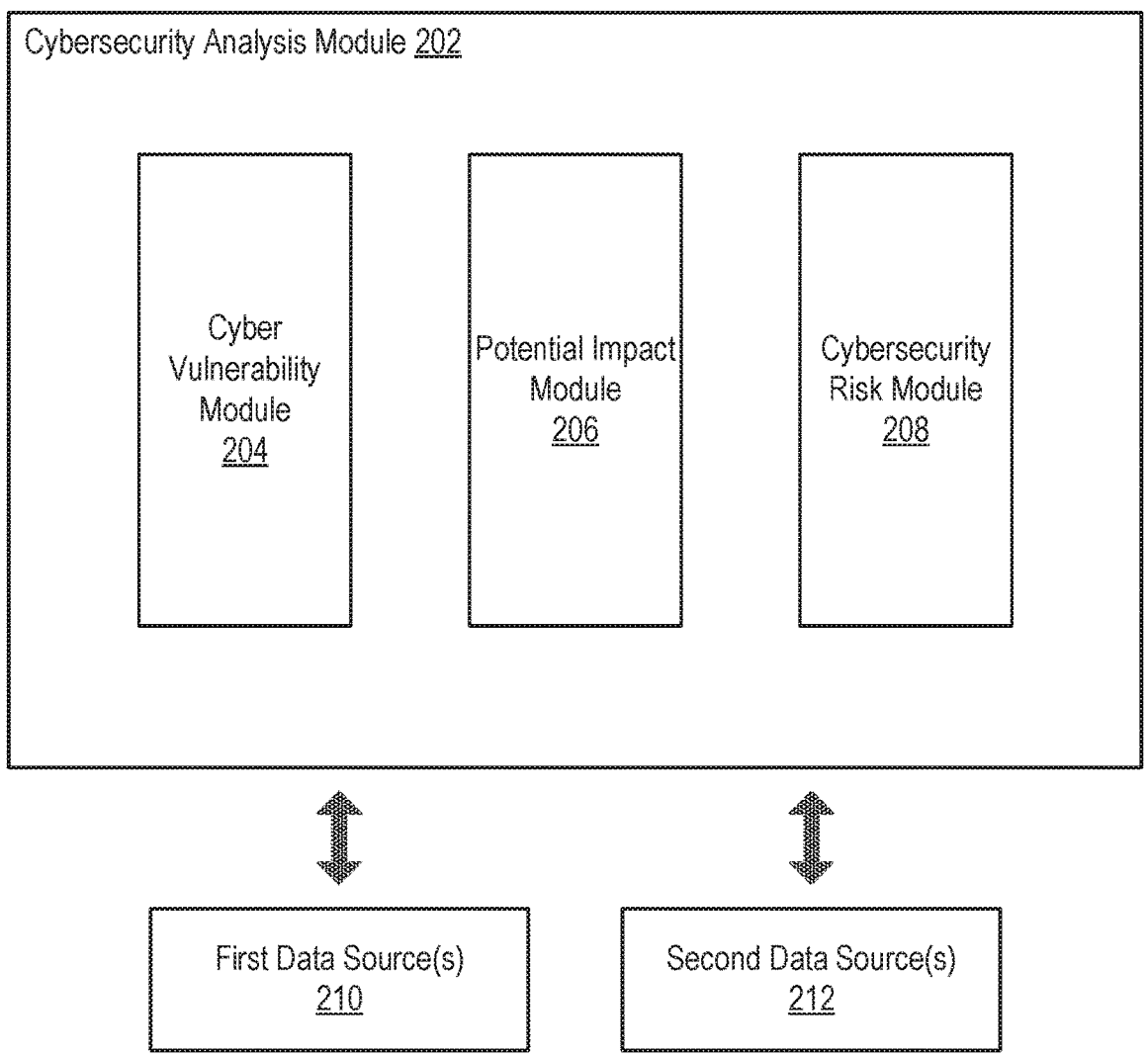
FIG. 2 illustrates an example system including an example cybersecurity analysis module configured to facilitate providing cybersecurity analysis based on operational technologies and information technologies, in accordance with an embodiment of the present disclosure.

FIG. 2 illustrates an example system 200 including an example cybersecurity analysis module 202 configured to facilitate providing cybersecurity analysis based on operational technologies and information technologies, in accordance with an embodiment of the present disclosure. In some embodiments, the cybersecurity analysis module 102 of FIG. 1 can be implemented as the example cybersecurity analysis module 202. As shown in FIG. 2, the example cybersecurity analysis module 202 can include a cyber vulnerability module 204, a potential impact module 206, and a cybersecurity risk module 208. In some instances, the example system 200 can also include at least a first group of data sources 210 and a second group of data sources 212. The components (e.g., modules, elements, data sources, etc.) shown in this figure and all figures herein are exemplary only, and other implementations may include additional, fewer, integrated, or different components. Some components may not be shown so as not to obscure relevant details.

In some embodiments, the cybersecurity analysis module 202 can be implemented, in part or in whole, using software, hardware, or any combination thereof. In general, a module can be associated with software, hardware, or any combination thereof. In some implementations, one or more functions, tasks, and/or operations of modules can be carried out or performed by software routines, software processes, hardware components, and/or any combination thereof. In some cases, the cybersecurity analysis module 202 can be implemented as software running on one or more computing devices or systems. In one example, at least a portion of the cybersecurity analysis module 202 can be implemented via one or more computing systems in a networked environment, such as via one or more remote or cloud servers. In another example, at least a portion of the cybersecurity analysis module 202 can be implemented within an application (e.g., app) on a computing device or system such as a smartphone, tablet, laptop, or desktop computer. In some embodiments, the cybersecurity analysis module 202 can be implemented by or with an energy management platform, such as the energy management platform 802 of FIG. 8 or the energy management platform 902 of FIG. 9. The energy management platform may provide the functionality(ies) of the cybersecurity analysis module 202 as a service or through software. The cybersecurity analysis module 202 can, in some instances, be implemented within a proprietary program used by an energy provider, such as a utility company. In some cases, the cybersecurity analysis module 202 can be implemented with a network resource, such as a website or webpage. It is contemplated that many variations are possible.

As discussed, the cybersecurity analysis module 202 can be configured to acquire data from various components, services, systems, etc., of the operational technology portion and the information technology portion of the energy delivery network. In some embodiments, the cybersecurity analysis module 202 can utilize the cyber vulnerability module 204 to facilitate acquiring a first set of data from the first group of data sources 210. The first group of data sources 210 can include, but is not limited to, a plurality of network components (i.e., energy network components) within the energy delivery network, such as various operational technology components or systems. Examples of the network components can include, but are not limited to, at least one of a router, a switch, a server, a firewall, a transformer, an energy distribution component, an energy transmission component, an energy generation component, and/or an energy delivery substation, etc. Additionally, the cyber vulnerability module 204 can also be configured to facilitate generating, based on (i.e., based at least in part on) the first set of data, a first metric indicating a likelihood that a particular network component, from the plurality of network components, is affected (e.g., has been affected, is currently affected, and/or may be affected in the future, etc.) by one or more cyber vulnerabilities. The cyber vulnerability module 204 will be discussed in more detail below with reference to FIG. 3A.

Moreover, the cybersecurity analysis module 202 can utilize the potential impact module 206 to facilitate acquiring a second set of data from the second group of data sources 212. The second group of data sources 212 can include, but is not limited to, a collection of services associated with the energy delivery network, such as various information technology services or systems. The potential impact module 206 can also be configured to facilitate generating, based on the second set of data, a second metric indicating a calculated impact to at least a portion of the energy delivery network when the one or more cyber vulnerabilities affect the particular network component. More details regarding the potential impact module 206 will be provided below with reference to FIG. 3B.

In some embodiments, at least some network components in the plurality of network components can be associated with operational technology. In some embodiments, at least some services in the collection of services can be associated with information technology. However, it so also contemplated that at least some of the network components can be associated with information technology and that at least some of the collection of services can be associated with operational technology.

Furthermore, the cybersecurity analysis module 202 can utilize the cybersecurity risk module 208 to facilitate generating, based on the first metric and the second metric, a third metric indicating an overall level of cybersecurity risk associated with the particular network component. The third metric can, for instance, represent a measure of cyber threat severity, for the particular network component, that takes into consideration the likelihood that the particular network component has one or more cyber vulnerabilities as well as the calculated potential impact to the energy delivery network (or at least a particular portion thereof) if and when the particular network component is affected by the one or more cyber vulnerabilities.

In some implementations, the cybersecurity risk module 208 can generate the third metric from a defined combination of the first metric and the second metric. In one example, in order to generate the third metric, the cybersecurity risk module 208 can apply a first weight value to the first metric to produce a first weighted metric. The cybersecurity risk module 208 can further apply a second weight value to the second metric to produce a second weighted metric. The cybersecurity risk module 208 can then combine the first weighted metric and the second weighted metric to produce the third metric. In another example, the energy provider (e.g., the utility company) can define how the first and second metrics are to be combined to produce the third metric. In a further example, the third metric can be generated based on utilizing one or more machine learning processes to determine how the first metric and the second metric are to be combined to produce the third metric. The one or more machine learning processes can ensure that the cybersecurity analysis module 202 is dynamically updated and is configured to detect emerging cybersecurity threats and vulnerabilities. In some cases, the machine learning processes can incorporate utility user feedback regarding the authenticity of detected threats and vulnerabilities as well as end customer impacts due to such threats and vulnerabilities. The machine learning processes can take into consideration data and user input regarding the authenticity and/or impact of detected threats and vulnerabilities by updating approaches to cybersecurity risk determination, traffic detection/monitoring, and/or impact calculation. It is contemplated that there can be numerous variations and/or other possibilities.

Furthermore, in some implementations, the cybersecurity risk module 208 can be configured to generate a plurality of third metrics, including the third metric indicating the overall level of cybersecurity risk associated with the particular network component, as discussed previously. Each third metric in the plurality of third metrics can indicate a respective overall level of cybersecurity risk associated with a respective network component in the plurality of network components. The cybersecurity risk module 208 can further rank the plurality of network components based on the plurality of third metrics to produce a ranked list of network components. Additionally, the cybersecurity risk module 208 can provide at least a portion of the ranked list of network components (e.g., at least a specified number of highest ranked network components) to the energy provider that utilizes the energy delivery network. Accordingly, the ranked list (and/or the plurality of third metrics) can help the energy provider determine priorities for examining the network components, repairing the network components, recording actions taken on the network components, recording the state of cybersecurity policy compliance of the network components, or otherwise addressing cybersecurity concerns at the network components. In some cases, the ranked list (and/or the plurality of third metrics) can be provided in association with a large amount of information, such as information that indicates which network components have been attacked, are currently being attacked, and/or will be attacked by cyber threats, which customers are affected, and so forth. Many variations are possible.

Figure 3A:
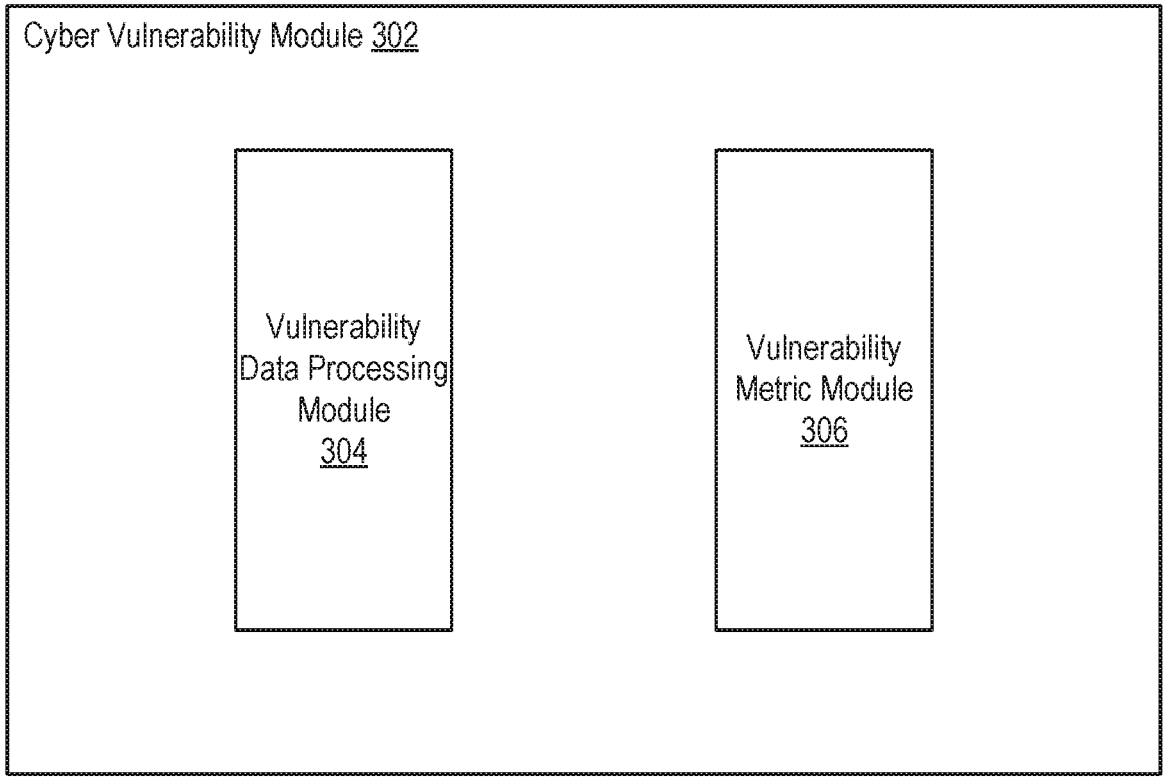
FIG. 3A illustrates an example cyber vulnerability module configured to facilitate providing cybersecurity analysis based on operational technologies and information technologies, in accordance with an embodiment of the present disclosure.

FIG. 3A illustrates an example cyber vulnerability module 302 configured to facilitate providing cybersecurity analysis based on operational technologies and information technologies, in accordance with an embodiment of the present disclosure. In some embodiments, the cyber vulnerability module 204 of FIG. 2 can be implemented as the example cyber vulnerability module 302. As shown in FIG. 3A, the cyber vulnerability module 302 can include a vulnerability data processing module 304 and a vulnerability metric module 306.

As discussed above, the cyber vulnerability module 302 can facilitate acquiring a first set of data from a first group of data sources. In some embodiments, the cyber vulnerability module 302 can utilize the vulnerability data processing module 304 to acquire the first set of data from the first group of data sources. In some embodiments, the first group of data sources can include, but is not limited to, at least one of a supervisory control and data acquisition (SCADA) command and control service, an enterprise firewall service, a log service, an intrusion prevention service, a security information and event management service (SIEM), and/or an intrusion protection service, etc.

Moreover, the first set of data can, for instance, be referred to as vulnerability data or cyber vulnerability data. Based on the cyber vulnerability data, the vulnerability data processing module 304 can determine one or more potential cyber vulnerabilities (if any) associated with network components in the energy delivery network, as well as various properties or metadata associated with the potential cyber vulnerabilities.

In some instances, the first set of data can be acquired using at least a portion of a network cybersecurity service, such as an end point protection provider, a security information event monitoring (SIEM) provider, an intrusion prevention provider, a behavioral threat detection provider, and/or an operational technology security product provider, etc. In some cases, the network cybersecurity service can correspond to a third-party service.

Furthermore, as discussed previously, the cyber vulnerability module 302 can be configured to generate, based on the first set of data, a first metric (i.e., a cyber vulnerability metric) indicating a likelihood that a particular network component is affected by one or more cyber vulnerabilities, such as viruses, malware, hackers, errors, etc. The cyber vulnerability module 302 can utilize the vulnerability metric module 306 to generate the first metric. In some cases, the first set of data can be associated with detected network traffic within the energy delivery network, such as network traffic detected at various network components within the energy delivery network. The vulnerability metric module 306 can generate the first metric based on analyzing the detected network traffic.

In some embodiments, analyzing the detected network traffic can include utilizing at least one of a syntax (or rule-based) indicator, a computed (or analytical) indicator, and/or an advanced behavioral indicator, etc. Moreover, the likelihood that the particular network component is affected by the one or more cyber vulnerabilities can be calculated, by the vulnerability metric module 306, based on the at least one of the syntax indicator, the computed indicator, or the advanced behavioral indicator.

In some cases, the cyber vulnerability module 302 can identify patterns and develop rules or syntax indicators for detecting illegitimate activities particular to the energy delivery network. For example, if the cyber vulnerability module 302 detects that an admin login fails to sufficiently correlate with the admin's deduced physical presence and/or that an unexpected pair of Internet Protocol (IP) addresses has appeared, then the first metric can be increased. In some instances, the cyber vulnerability module 302 can perform analytics and/or detect computed indicators. For example, if the cyber vulnerability module 302 detects protocol anomalies, unexpected device appearances, unexpected MAC addresses, unauthorized access attempts, and/or unexpected privilege escalations (e.g., a user unexpectedly attempting to perform an unpermitted task), etc., then the first metric can be increased. In some instances, the cyber vulnerability module 302 can detect advanced behavior indicators. For example, if the cyber vulnerability module 302 detects unexpected bandwidth spikes, unexpected CPU usage spikes, a command received at an unexpected time, and/or a trust boundary violation, then the first metric can be increased. It should be appreciated that there can be many variations or other possibilities.

In one example, the syntax indicator can be based on analysis of at least one of an Internet Protocol (IP) address associated with the detected network traffic or an email address associated with the detected network traffic. In this example, if the IP address and/or the email address is determined to be linked to an illegitimate source, system, entity, account, etc., then the first metric can be increased. In another example, the computed indicator can be based on analysis of at least one of a message-digest algorithm (e.g., MD5) hash value associated with the detected network traffic or a regular expression (e.g., spam message keyword) associated with the detected network traffic. In this example, if the hash value is determined to be related to a virus, malware, Trojan, etc., and/or if the regular expression is determined to be related to a spam communication, a phishing message, a piece of junk mail, etc., then the first metric can be increased. In a further example, the advanced behavioral indicator can be based on analysis of at least one of a multiple-step series of activities associated with the detected network traffic or a combination of multiple indicators associated with the detected network traffic. In this example, if a particular sequence of multiple activities is unexpected/unusual and/or if a significant quantity of unexpected/unusual activity indicators are detected, then the first metric can be increased. Again, many variations are possible.

Figure 3B:
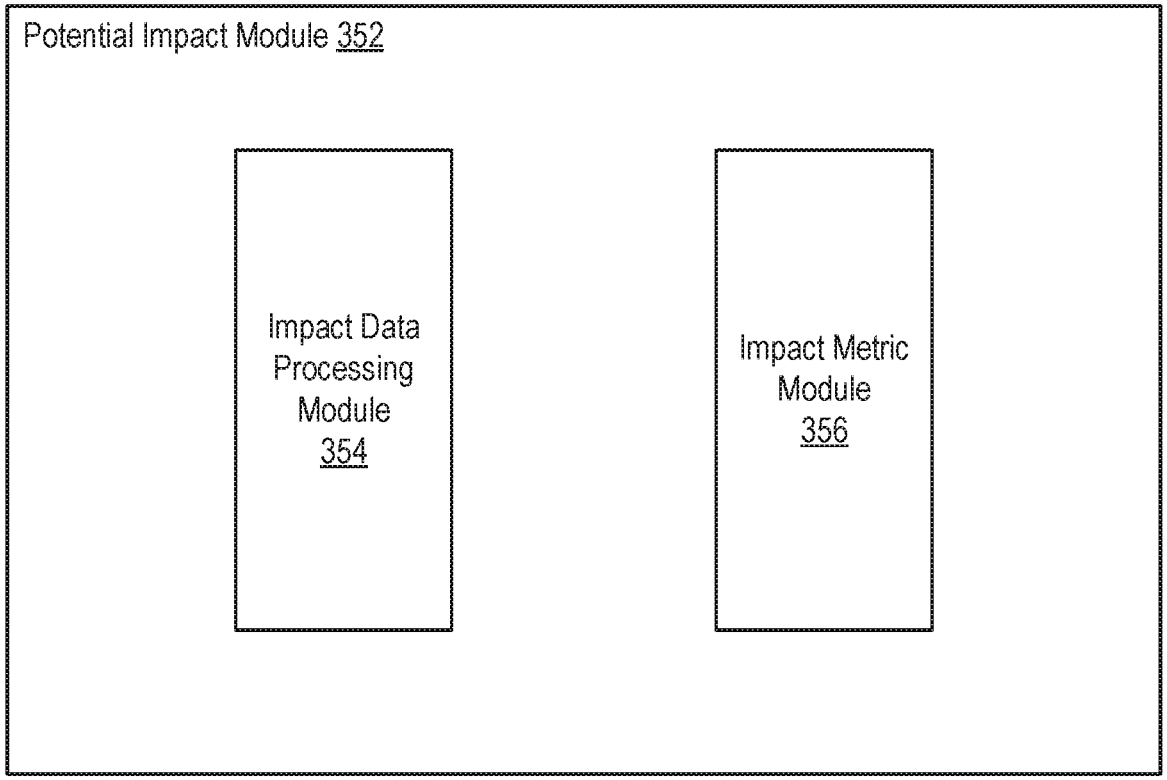
FIG. 3B illustrates an example potential impact module configured to facilitate providing cybersecurity analysis based on operational technologies and information technologies, in accordance with an embodiment of the present disclosure.

FIG. 3B illustrates an example potential impact module 352 configured to facilitate providing cybersecurity analysis based on operational technologies and information technologies, in accordance with an embodiment of the present disclosure. In some embodiments, the potential impact module 206 of FIG. 2 can be implemented as the example potential impact module 352. In some instances, the potential impact module 352 can recognize or have access to information about how the energy delivery network is configured (e.g., which customers are connected to which substations, how customers are connected to substations, how much energy is passing through each substation, how customers use delivered energy, etc.). Such information can assist the potential impact module 352 to facilitate providing cybersecurity analysis. As shown in FIG. 3B, the potential impact module 352 can include an impact data processing module 354 and an impact metric module 356.

The potential impact module 352 can utilize the impact data processing module 354 to facilitate acquiring a second set of data from a second group of data sources including a collection of services associated with the energy delivery network. The collection of services can, for instance, include information technology services or systems. Examples of the collection of services can include, but are not limited to, at least one of a phone service, a meter data management service, a customer information service, a geographic information service, a work management service, an enterprise asset management service, a smart meter head end service, an energy management service, a demand management service, an outage management service, a customer care and billing service, an enterprise communications service, and/or a threat and vulnerability detection library service, etc. In some instances, the impact data processing module 354 can acquire the second set of data using at least a portion of an energy management platform (e.g., the energy management platform 802 of FIG. 8, the energy management platform 902 of FIG. 9). For instance, at least the portion of the energy management platform can be implemented as the impact data processing module 354, can perform one or more functions of the impact data processing module 354, and/or can operate in conjunction with the impact data processing module 354 to acquire the second set of data from the second group of data sources.

Moreover, the potential impact module 352 can utilize the impact metric module 356 to facilitate generating, based on the second set of data, a second metric (i.e., a potential impact metric) indicating a calculated impact to at least a portion of the energy delivery network when one or more cyber vulnerabilities affect the particular network component. In some cases, the second set of data can be associated with at least one of customer data relating to the energy delivery network, operations data relating to the energy delivery network, or economic data relating to the energy delivery network.

In some embodiments, the impact metric module 356 can generate the second metric based on analyzing the at least one of the customer data, the operations data, or the economic data. In one example, the customer data can be associated with at least one of a customer count, an issue resolution time, a reliability index, and/or a customer criticality metric, etc. In this example, if the customer count associated with the particular network component is larger, if the amount of time to resolve the one or more cyber vulnerabilities is higher, if the particular network component has an impact reliability index or score that at least meets a specified impact reliability threshold, and/or if the criticality of the customers is higher (e.g., the customer is a hospital, police department, fire department, etc.), then the second metric can be increased. In another example, the operations data can be associated with at least one of a labor cost, a materials cost, a physical damage likelihood metric, and/or a degree of redundancy, etc. In this example, if the cost(s) and/or the damage likelihood metric is higher and/or if the degree of redundancy (e.g., back-up systems) is lower, then the second metric can be increased. In a further example, the economic data can be associated with at least one of an energy delivery cost, an equipment cost, and/or a regulatory penalty, etc. In this example, if the costs(s) and/or penalties are higher, then the second metric can be increased. Again, many variations are possible.

Figure 4:
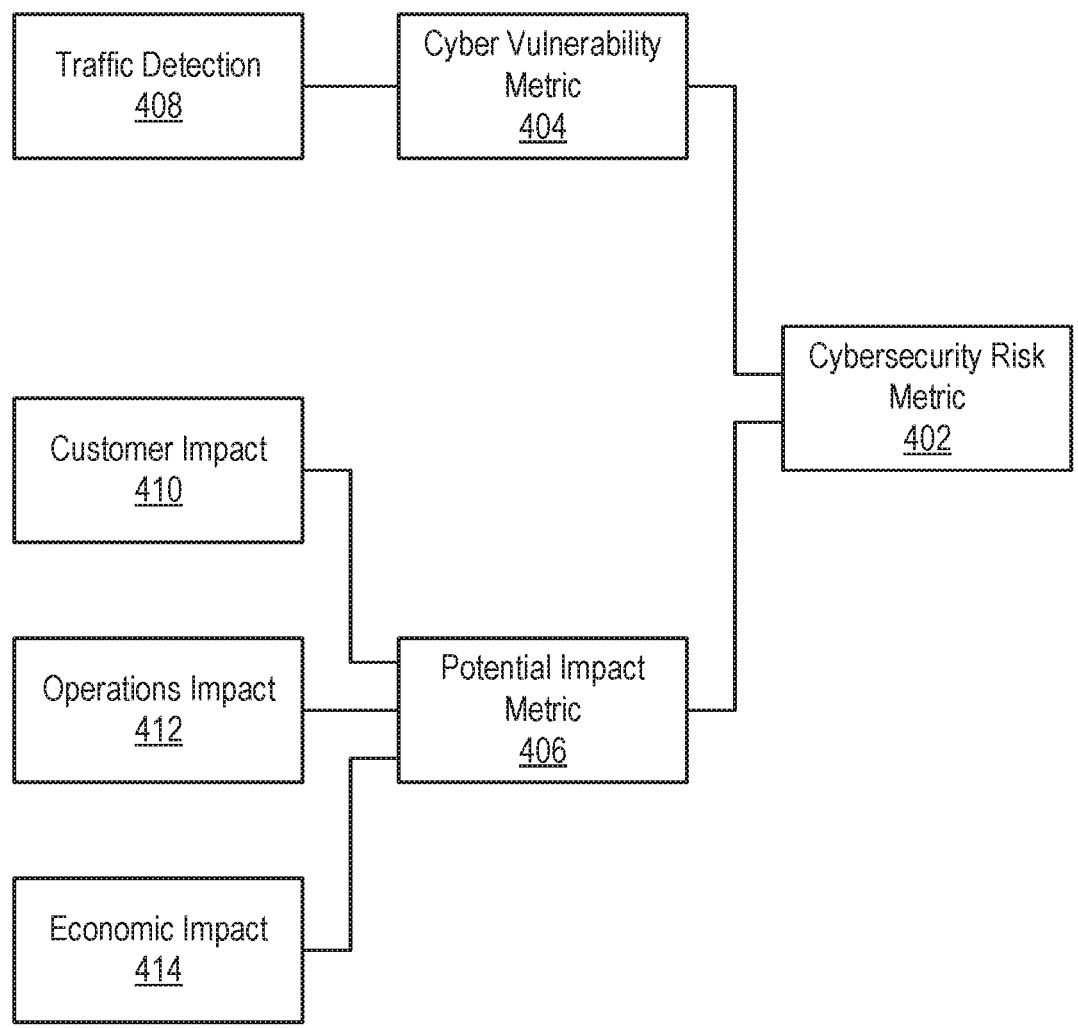
FIG. 4 illustrates an example block diagram associated with providing cybersecurity analysis based on operational technologies and information technologies, in accordance with an embodiment of the present disclosure.

FIG. 4 illustrates an example block diagram 400 associated with providing cybersecurity analysis based on operational technologies and information technologies, in accordance with an embodiment of the present disclosure. The block diagram 400 shows an example of how cybersecurity analysis performed based on the disclosed technology can provide, calculate, determine, or otherwise generate a cybersecurity risk metric (or score) 402 for a particular component (or for a particular set of components) in an energy delivery network. The cybersecurity analysis can indicate whether particular components are experiencing unusual, abnormal, or unexpected activity. Based on the cybersecurity analysis, a priority or urgency level for repairing components affected by cyber threats can also be determined. Again, all examples provided herein are for illustrative purposes and it should be understood that numerous variations are possible.

As shown in the example block diagram 400, the cybersecurity risk metric 402 (i.e., the third metric generated by the cybersecurity risk module 208 of FIG. 2) can be based on (i.e., based at least in part on) combining the cyber vulnerability metric 404 and the potential impact metric 406. The cyber vulnerability metric 404 can be generated based on traffic detection 408. For example, generating the cyber vulnerability metric 404 can include analyzing detected network traffic, as discussed previously. Furthermore, the potential impact metric 406 can be generated based on customer impact 410, operations impact 412, and/or economic impact 414. For instance, as discussed above, generating the potential impact metric 406 can include analyzing at least one of customer data relating to the energy delivery network, operations data relating to the energy delivery network, or economic data relating to the energy delivery network. It should be appreciated that there can be many variations or other possibilities.

Figure 5:
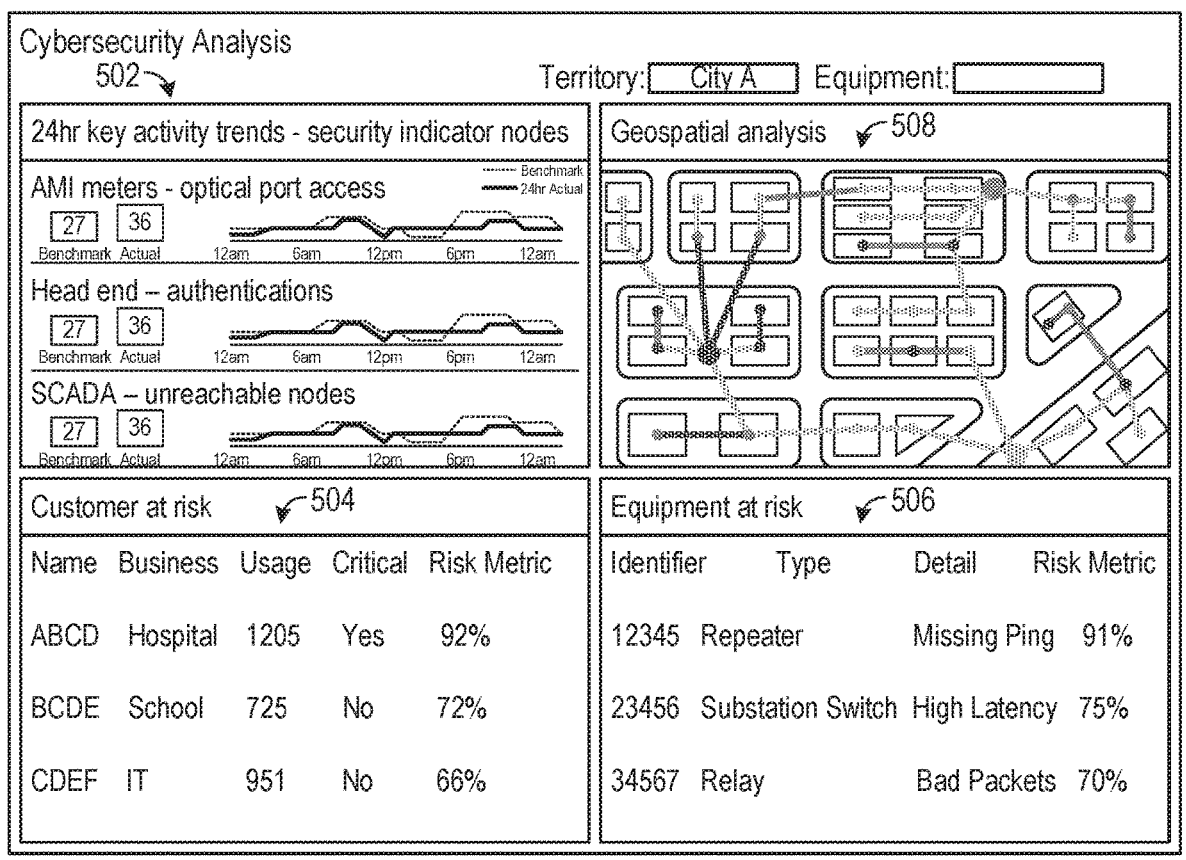
FIG. 5 illustrates an example screenshot associated with providing cybersecurity analysis based on operational technologies and information technologies, in accordance with an embodiment of the present disclosure.

FIG. 5 illustrates an example screenshot 500 associated with providing cybersecurity analysis based on operational technologies and information technologies, in accordance with an embodiment of the present disclosure. The example screenshot 500 shows an example interface for providing cybersecurity analysis based on operational technologies and information technologies.

In some cases, the example interface can provide an interface portion 502 that presents information about activity(ies) associated with detected network traffic. In some embodiments, the example interface can provide another interface portion 504 that presents information about customers, such as in the form of a ranked list of customers who are affected or at risk of being affected by cyber threats. Moreover, in some instances, the example interface can provide an additional interface portion 506 that presents information about network components, equipment, and/or assets. The interface portion 506 can, for example, present a ranked list of network components that are affected or at risk of being affected by cyber threats. In some cases, interface portion 506 can also present information about why or how network components are affected or at risk of being affected by cyber threats.

In some implementations, a set of visualizations (e.g., graphical elements) for a set of network components identified in the ranked list of network components can be generated. The example interface can further provide an interface portion 508 that presents the generated set of visualizations for the set of network components identified in the ranked list of network components. Each visualization in the set of visualizations can represent a corresponding network component in the set of network components. In some instances, each visualization can be presented in association with a particular color determined based on at least one of a ranking for the corresponding network component or a corresponding overall level of cybersecurity risk associated with the corresponding network component. Again, the example screenshot 500 and other examples herein are provided for illustrative purposes and it is contemplated that many variations are possible.

FIG. 6 illustrates an example method 600 associated with providing cybersecurity analysis based on operational technologies and information technologies, in accordance with an embodiment of the present disclosure. It should be understood that there can be additional, fewer, or alternative steps performed in similar or alternative orders, or in parallel, within the scope of the various embodiments unless otherwise stated.

At block 602, the example method 600 can acquire a first set of data from a first group of data sources including a plurality of network components within an energy delivery network. At block 604, the example method 600 can generate, based on the first set of data, a first metric indicating a likelihood that a particular network component, from the plurality of network components, is affected (e.g., has been affected, is currently affected, and/or may be affected in the future, etc.) by one or more cyber vulnerabilities. At block 606, the example method 600 can acquire a second set of data from a second group of data sources including a collection of services associated with the energy delivery network. At block 608, the example method 600 can generate, based on the second set of data, a second metric indicating a calculated impact to at least a portion of the energy delivery network when the one or more cyber vulnerabilities affect the particular network component. At block 610, the example method 600 can generate, based on the first metric and the second metric, a third metric indicating an overall level of cybersecurity risk associated with the particular network component.

In some cases, the overall level of cybersecurity risk as indicated by the third metric can correspond to a proprietary composite measure of cybersecurity risk. The proprietary composite measure of cybersecurity risk can, in some embodiments, be produced or outputted based on (i.e., based at least in part on) information about cyber vulnerability(ies) and information about impact. In some instances, a cyber vulnerability can refer to an intrinsic susceptibility of a component to one or more cyber threats and can include information about provided or inputted cybersecurity risk (e.g., a third-party-provided/calculated likelihood of exploitation of a particular vulnerability by an entity at a particular time on a particular component/system). The provided or inputted cybersecurity risk can sometimes incorporate financial or service impact. Accordingly, the proprietary composite measure of cybersecurity risk can be produced or outputted based on information about cyber vulnerability(ies) (which can include inputted/provided cybersecurity risk data) and information about impact. It should be appreciated that many variations are possible.

FIG. 7A illustrates an example method 700 associated with providing cybersecurity analysis based on operational technologies and information technologies, in accordance with an embodiment of the present disclosure. As discussed, it should be understood that there can be additional, fewer, or alternative steps performed in similar or alternative orders, or in parallel, within the scope of the various embodiments unless otherwise stated.

At block 702, the example method 700 can generate a plurality of third metrics including the third metric indicating the overall level of cybersecurity risk associated with the particular network component. Each third metric in the plurality of third metrics can indicate a respective overall level of cybersecurity risk associated with a respective network component in the plurality of network components. At block 704, the example method 700 can rank the plurality of network components based on the plurality of third metrics to produce a ranked list of network components. At block 706, the example method 700 can provide at least a portion of the ranked list of network components to an energy provider that utilizes the energy delivery network.

FIG. 7B illustrates an example method 750 associated with providing cybersecurity analysis based on operational technologies and information technologies, in accordance with an embodiment of the present disclosure. Again, it should be appreciated that there can be additional, fewer, or alternative steps performed in similar or alternative orders, or in parallel, within the scope of the various embodiments unless otherwise stated.

At block 752, the example method 750 can apply a first weight value to the first metric to produce a first weighted metric. At block 754, the example method 750 can apply a second weight value to the second metric to produce a second weighted metric. At block 756, the example method 750 can combine the first weighted metric and the second weighted metric to produce the third metric.

It is further contemplated that there can be many other uses, applications, and/or variations associated with the various embodiments of the present disclosure. For instance, in some cases, the example cybersecurity analysis module 102 of FIG. 1 can be implemented, in part or in whole, as software, hardware, or any combination thereof, as discussed above. In some embodiments, the cybersecurity analysis module 102 can be implemented with an energy management platform, such as the energy management platform 802 of FIG. 8 and/or the energy management platform 902 of FIG. 9.

Example Energy Management Platform

Figure 8:
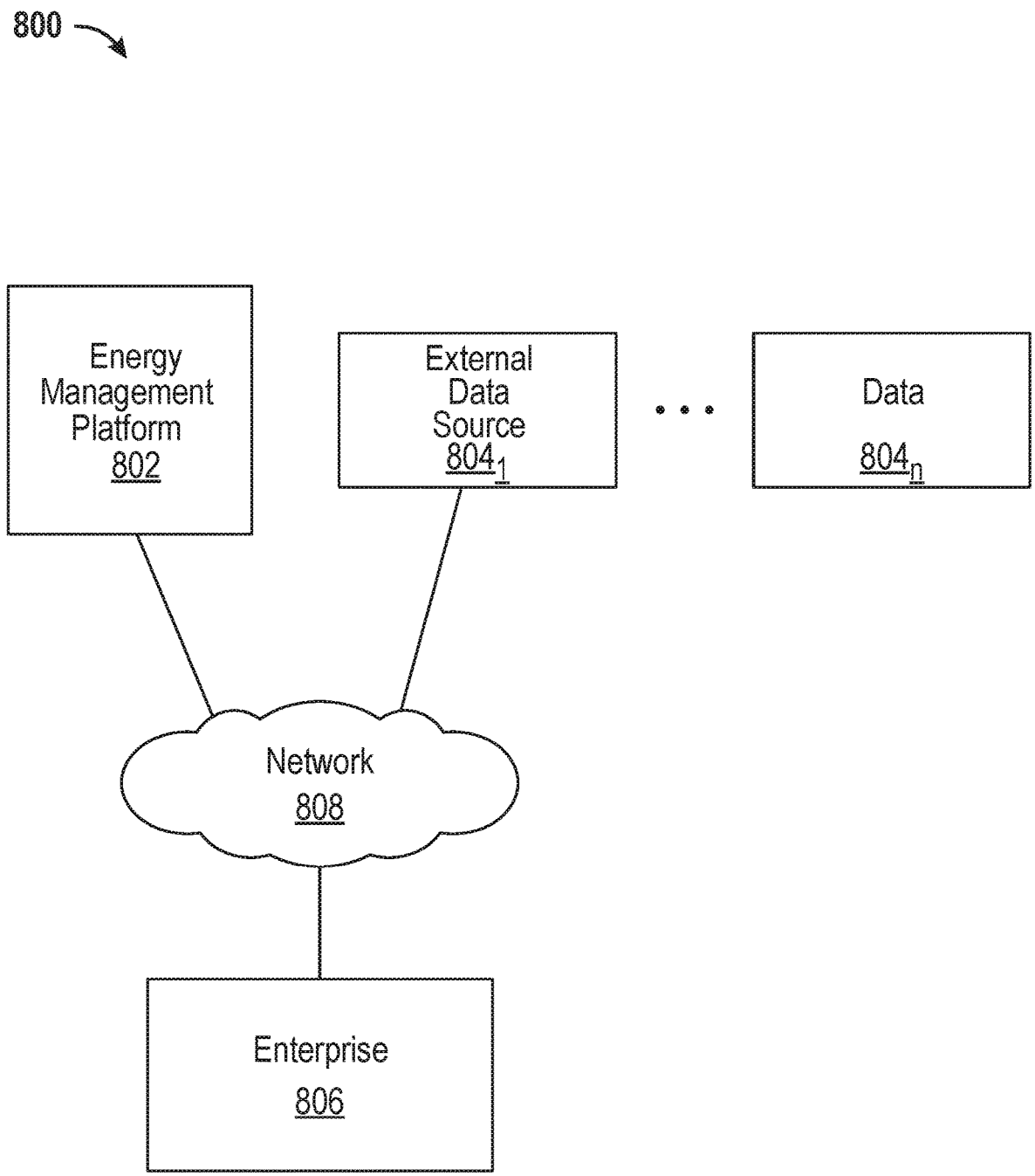
FIG. 8 illustrates an example environment for energy management, in accordance with an embodiment of the present disclosure.

FIG. 8 illustrates an example environment 800 for energy management, in accordance with an embodiment of the present disclosure. The environment 800 includes an energy management platform 802, external data sources 8041-n, an enterprise 806, and a network 808. The energy management platform 802 can provide functionality to allow the enterprise 806 to track, analyze, and optimize energy usage of the enterprise 806. The energy management platform 802 may constitute an analytics platform. The analytics platform may handle data management, multi-layered analysis, and data visualization capabilities for all applications of the energy management platform 802. The analytics platform may be specifically designed to process and analyze significant volumes of frequently updated data while maintaining high performance levels.

The energy management platform 802 may communicate with the enterprise 806 through user interfaces (UIs) presented by the energy management platform 802 for the enterprise 806. The UIs may provide information to the enterprise 806 and receive information from the enterprise 806. The energy management platform 802 may communicate with the external data sources 8041-n through APIs (Application Programming Interfaces) and other communication interfaces. Communications involving the energy management platform 802, the external data sources 8041-n, and the enterprise 806 are discussed in more detail herein.

The energy management platform 802 may be implemented as a computer system, such as a server or series of servers and other hardware (e.g., applications servers, analytic computational servers, database servers, data integrator servers, network infrastructure (e.g., firewalls, routers, communication nodes)). The servers may be arranged as a server farm or cluster. Embodiments of the present disclosure may be implemented on the server side, on the client side, or a combination of both. For example, embodiments of the present disclosure may be implemented by one or more servers of the energy management platform 802. As another example, embodiments of the present disclosure may be implemented by a combination of servers of the energy management platform 802 and a computer system of the enterprise 806.

The external data sources 8041-n may represent a multitude of possible sources of data relevant to energy management analysis. The external data sources 8041-n may include, for example, grid and utility operational systems, meter data management (MDM) systems, customer information systems (CIS), billing systems, utility customer systems, utility enterprise systems, utility energy conservation measures, and rebate databases. The external data sources 8041-n also may include, for example, building characteristic systems, weather data sources, third-party property management systems, and industry-standard benchmark databases.

The enterprise 806 may represent a user (e.g., customer) of the energy management platform 802. The enterprise 806 may include any private or public concern, such as large companies, small and medium businesses, households, individuals, governing bodies, government agencies, non-governmental organizations, nonprofits, etc. The enterprise 806 may include energy providers and suppliers (e.g., utilities), energy service companies (ESCOs), and energy consumers. The enterprise 806 may be associated with one or many facilities distributed over many geographic locations. The enterprise 806 may be associated with any purpose, industry, or other type of profile.

The network 808 may use standard communications technologies and protocols. Thus, the network 808 may include links using technologies such as Ethernet, IEEE 802.11, worldwide interoperability for microwave access (WiMAX) (WiMAX is a trademark of the WiMAX Forum®), 3G, 4G, CDMA (Code Division Multiple Access), GSM (Global System for Mobile Communications), LTE (Long Term Evolution), digital subscriber line (DSL), etc. Similarly, the networking protocols used on the network 808 may include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 808 may be represented using technologies and/or formats including hypertext markup language (HTML) and extensible markup language (XML). In addition, all or some links may be encrypted using conventional encryption technologies such as secure sockets layer (SSL), transport layer security (TLS), and Internet Protocol security (IPsec).

In an embodiment, each of the energy management platform 802, the external data sources 8041-n, and the enterprise 806 may be implemented as a computer system (or device). The computer system (or device) may include one or more machines, each of which may be implemented as machine 1100 of FIG. 11, which is described in further detail herein.

Figure 9:
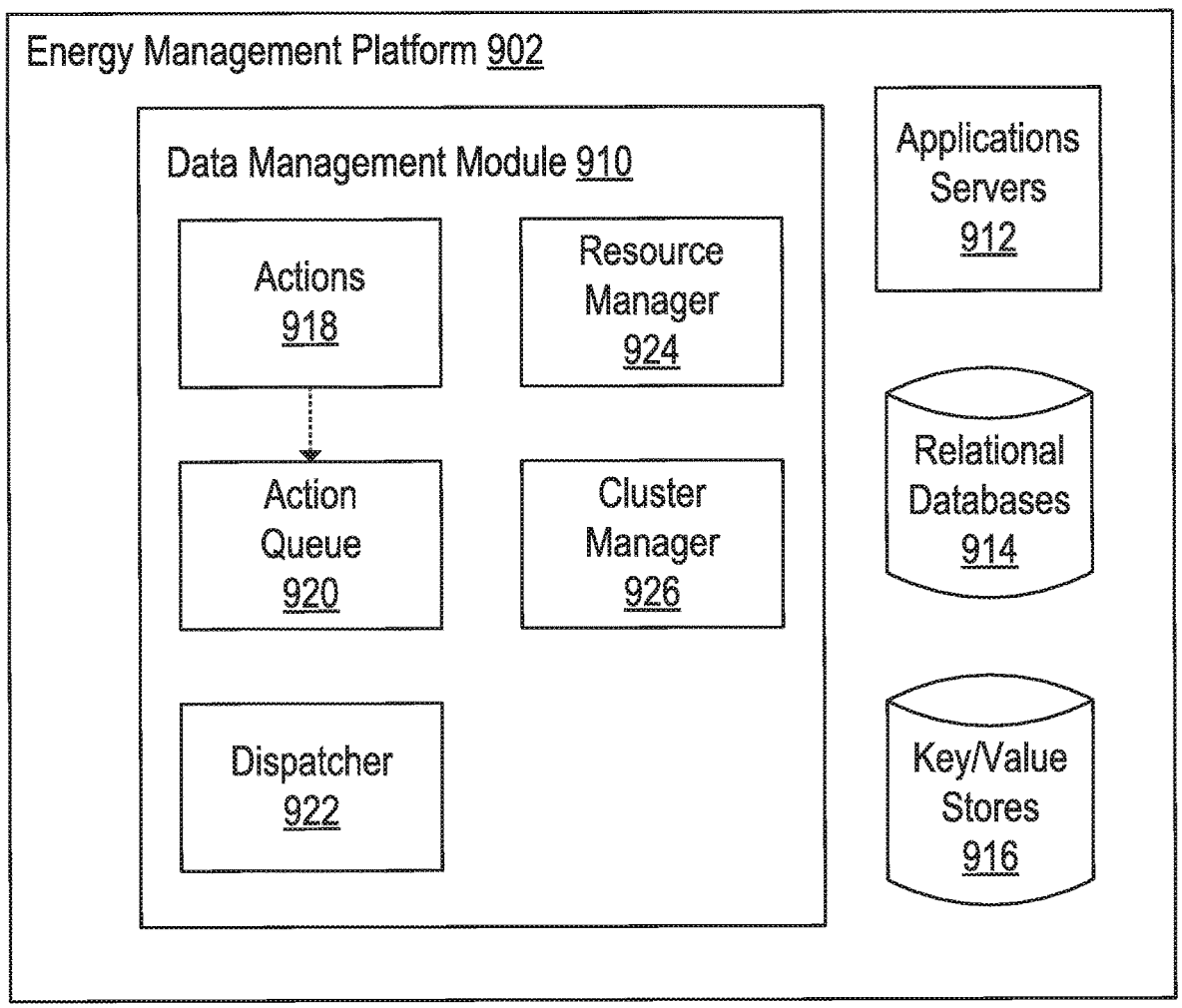
FIG. 9 illustrates an example energy management platform, in accordance with an embodiment of the present disclosure.

FIG. 9 illustrates an example energy management platform 902, in accordance with an embodiment of the present disclosure. In some embodiments, the example energy management platform 902 can be implemented as the energy management platform 802 of FIG. 8. In an embodiment, the energy management platform 902 may include a data management module 910, applications servers 912, relational databases 914, and key/value stores 916. In some embodiments, the energy management platform 902 can also include a cybersecurity analysis module (e.g., the cybersecurity analysis module 102 of FIG. 1).

The data management module 910 may support the capability to automatically and dynamically scale a network of computing resources for the energy management platform 902 according to demand on the energy management platform 902. The dynamic scaling supported by the data management module 910 may include the capability to provision additional computing resources (or nodes) to accommodate increasing computing demand. Likewise, the data management module 910 may include the capability to release computing resources to accommodate decreasing computing demand. The data management module 910 may include one or more action(s) 918, a queue 920, a dispatcher 922, a resource manager 924, and a cluster manager 926.

The actions 918 may represent the tasks that are to be performed in response to requests that are provided to the energy management platform 902. Each of the actions 918 may represent a unit of work to be performed by the applications servers 912. The actions 918 may be associated with data types and bound to engines (or modules). The requests may relate to any task supported by the energy management platform 902. For example, the request may relate to, for example, analytic processing, loading energy-related data, retrieving an ENERGY STAR® reading, retrieving benchmark data, etc. The actions 918 are provided to the action queue 920.

The action queue 920 may receive each of the actions 918. The action queue 920 may be a distributed task queue and represents work that is to be routed to an appropriate computing resource and then performed.

The dispatcher 922 may associate and hand-off a queued action to an engine that will execute the action. The dispatcher 922 may control routing of each queued action to a particular one of the applications servers 912 based on load balancing and other optimization considerations. The dispatcher 922 may receive an instruction from the resource manager 924 to provision new nodes when the current computing resources are at or above a threshold capacity. The dispatcher 922 also may receive an instruction from the resource manager to release nodes when the current computing resources are at or below a threshold capacity. The dispatcher 922 accordingly may instruct the cluster manager 926 to dynamically provision new nodes or release existing nodes based on demand for computing resources. The nodes may be computing nodes or storage nodes in connection with the applications servers 912, the relational databases 914, and the key/value stores 916.

The resource manager 924 may monitor the action queue 920. The resource manager 924 also may monitor the current load on the applications servers 912 to determine the availability of resources to execute the queued actions. Based on the monitoring, the resource manager may communicate, through the dispatcher 922, with the cluster manager 926 to request dynamic allocation and de-allocation of nodes.

The cluster manager 926 may be a distributed entity that manages all of the nodes of the applications servers 912. The cluster manager 926 may dynamically provision new nodes or release existing nodes based on demand for computing resources. The cluster manager 926 may implement a group membership services protocol. The cluster manager 926 also may perform a task monitoring function. The task monitoring function may involve tracking resource usage, such as CPU utilization, the amount of data read/written, storage size, etc.

The applications servers 912 may perform processes that manage or host analytic server execution, data requests, etc. The engines provided by the energy management platform 902, such as the engines that perform data services, batch processing, and stream services, may be hosted within the applications servers 912. The engines are discussed in more detail herein.

In an embodiment, the applications servers 912 may be part of a computer cluster of a plurality of loosely or tightly connected computers that are coordinated to work as a system in performing the services and applications of the energy management platform 902. The nodes (e.g., servers) of the cluster may be connected to each other through fast local area networks ("LAN"), with each node running its own instance of an operating system. The applications servers 912 may be implemented as a computer cluster to improve performance and availability over that of a single computer, while typically being more cost-effective than single computers of comparable speed or availability. The applications servers 912 may be software, hardware, or a combination of both.

The relational databases 914 may maintain various data supporting the energy management platform 902. In an embodiment, non-time series data may be stored in the relational databases 914, as discussed in more detail herein.

The key/value stores 916 may maintain various data supporting the energy management platform 902. In an embodiment, time series data (e.g., meter readings, meter events, etc.) may be stored in the key/value store, as discussed in more detail herein. In an embodiment, the key/value stores 916 may be implemented with APACHE CASSANDRA®, an open source distributed database management system designed to handle large amounts of data across a multitude of commodity servers. In an embodiment, other database management systems for key/value stores may be used.

In an embodiment, one or more of the applications servers 912, the relational databases 914, and the key/value stores 916 may be implemented by the entity that owns, maintains, or controls the energy management platform 902.

In an embodiment, one or more of the applications servers 912, the relational databases 914, and the key/value stores 916 may be implemented by a third party that may provide a computing environment for lease to the entity that owns, maintains, or controls the energy management platform 902. In an embodiment, the applications servers 912, the relational databases 914, and the key/value stores 916 implemented by the third party may communicate with the energy management platform 902 through a network, such as the network 808 of FIG. 8.

The computing environment provided by the third party for the entity that owns, maintains, or controls the energy management platform 902 may be a cloud computing platform that allows the entity that owns, maintains, or controls the energy management platform 902 to rent virtual computers on which to run computer applications. Such applications may include, for example, the applications performed by the applications servers 912, as discussed in more detail herein. In an embodiment, the computing environment may allow a scalable deployment of applications by providing a web service through which the entity that owns, maintains, or controls the energy management platform 902 can boot a virtual appliance used to create a virtual machine containing any software desired. In an embodiment, the entity that owns, maintains, or controls the energy management platform 902 may create, launch, and terminate server instances as needed, paying based on time usage, data usage, or any combination of these or other factors. The ability to provision and release computing resources in this manner supports the ability of the energy management platform 902 to dynamically scale according to the demand on the energy management platform 902.

Figure 10:
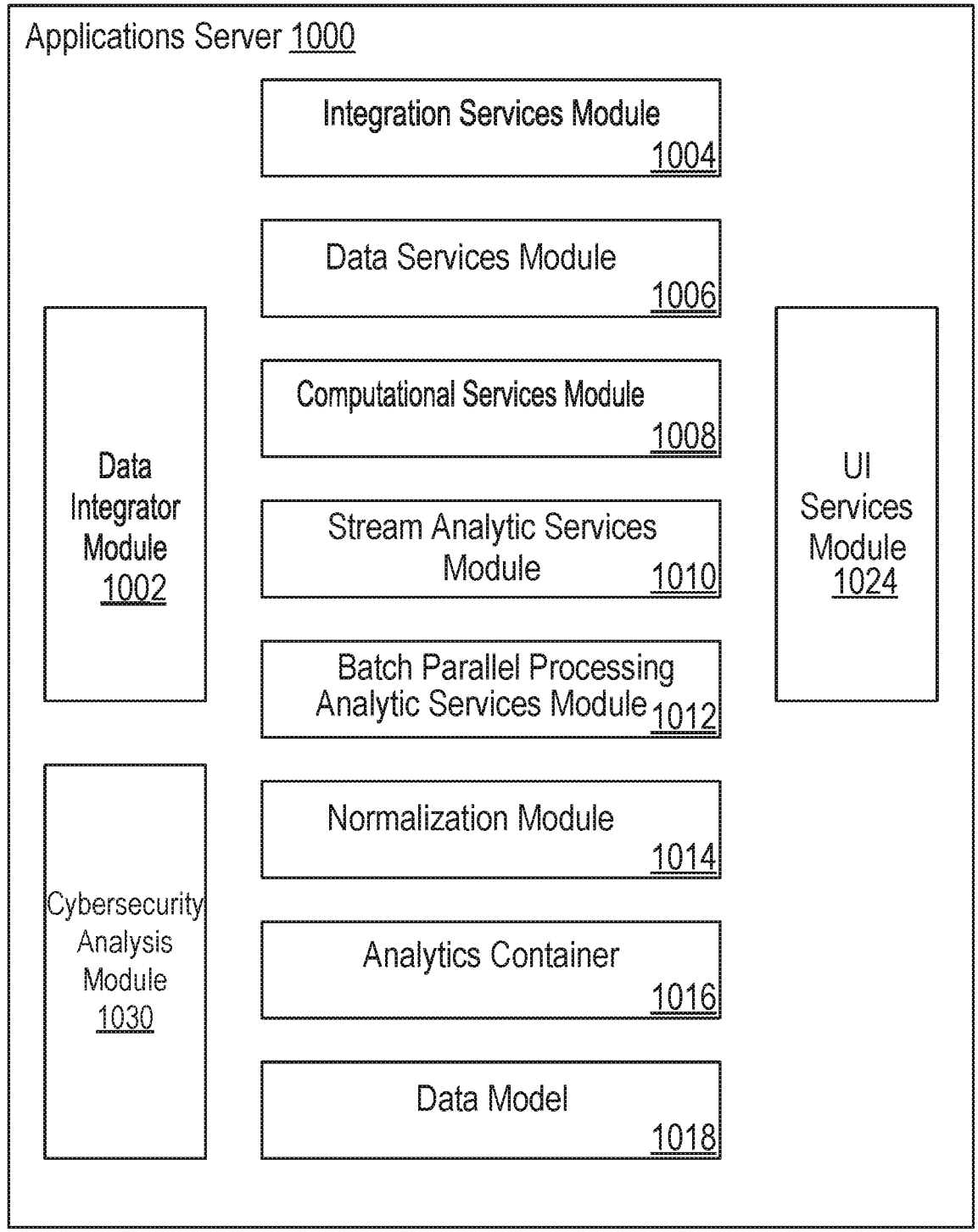
FIG. 10 illustrates an example applications server of an energy management platform, in accordance with an embodiment of the present disclosure.

FIG. 10 illustrates an example applications server 1000 of an energy management platform, in accordance with an embodiment of the present disclosure. In an embodiment, one or more of the applications servers 912 of FIG. 9 may be implemented with applications server 1000 of FIG. 10. The applications server 1000 includes a data integrator (data loading) module 1002, an integration services module 1004, a data services module 1006, a computational services module 1008, a stream analytic services module 1010, a batch parallel processing analytic services module 1012, a normalization module 1014, an analytics container 1016, a data model 1018, and a user interface (UI) services module 1024. In some embodiments, the applications server 1000 can also include a cybersecurity analysis module 1030. In some cases, the cybersecurity analysis module 1030 can be implemented as the cybersecurity analysis module 102 of FIG. 1.

In some embodiments, the analytics platform supported by the applications server 1000 includes multiple services that each handles a specific data management or analysis capability. The services include the data integrator module 1002, the integration services module 1004, the data services module 1006, the computational services module 1008, the stream analytic services module 1010, batch parallel processing analytic services module 1012, and the UI services module 1024. All or some services within the analytics platform may be modular and accordingly architected specifically to execute their respective capabilities for large data volumes and at high speed. The services may be optimized in software for high performance distributed computing over a computer cluster including the applications servers 912.

The modules and components of the applications server 1000 in FIG. 10 and all the figures herein are merely exemplary, and may be variously combined into fewer modules and components, or separated into additional modules and components. The described functionality of the modules and components may be performed by other modules and components.

Example Machine

Figure 11:
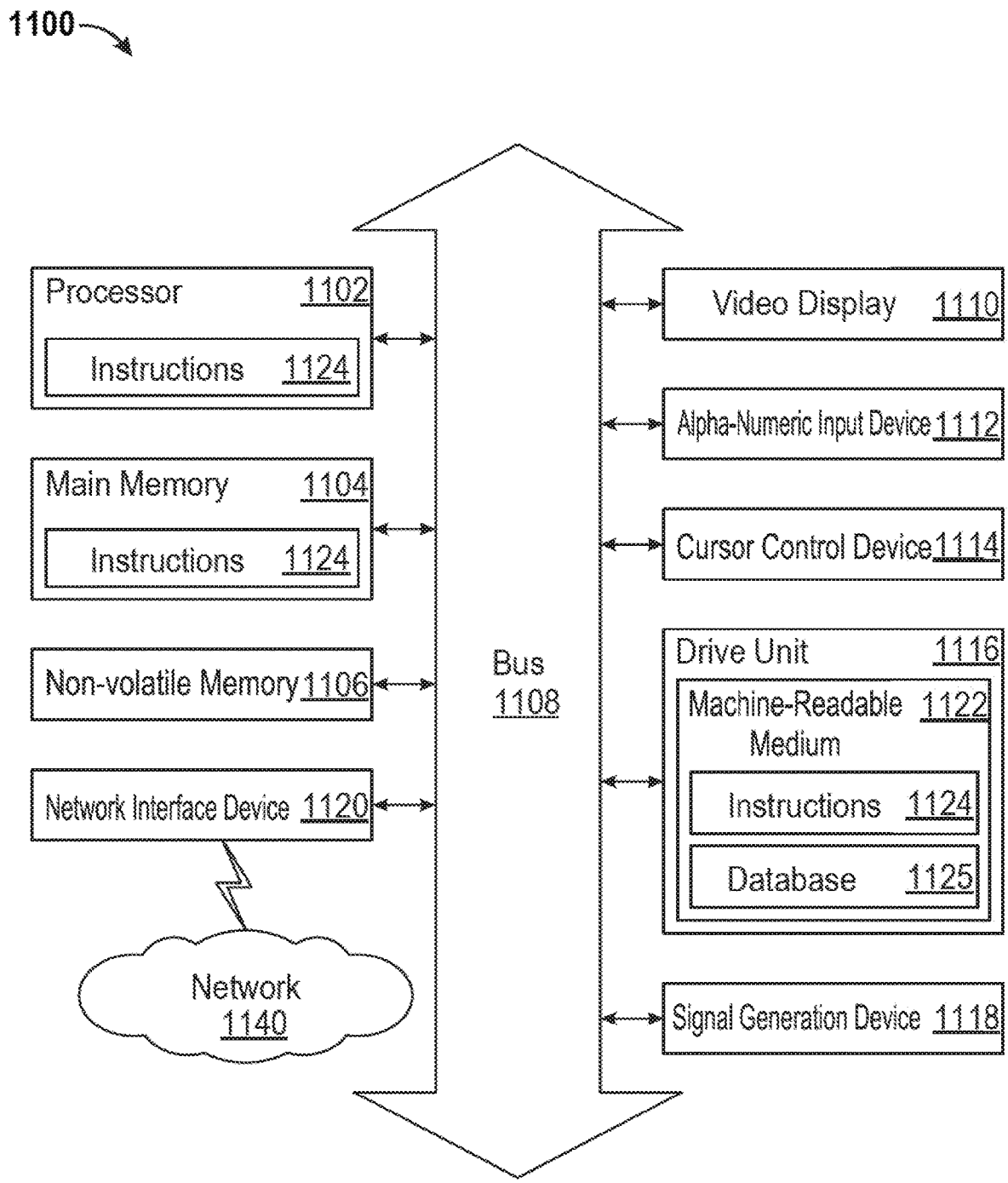
FIG. 11 illustrates an example machine within which a set of instructions for causing the machine to perform one or more of the embodiments described herein can be executed, in accordance with an embodiment of the present disclosure.

FIG. 11 illustrates an example machine 1100 within which a set of instructions for causing the machine to perform one or more of the embodiments described herein can be executed, in accordance with an embodiment of the present disclosure. The machine may be connected (e.g., networked) to other machines. In a networked deployment, the machine may operate in the capacity of a server or a client machine in a client-server network environment, or as a peer machine in a peer-to-peer (or distributed) network environment.

The machine 1100 includes a processor 1102 (e.g., a central processing unit (CPU), a graphics processing unit (GPU), or both), a main memory 1104, and a nonvolatile memory 1106 (e.g., volatile RAM and non-volatile RAM), which communicate with each other via a bus 1108. In some cases, the example machine 1100 can correspond to, include, or be included within a computing device or system. For example, in some embodiments, the machine 1100 can be a desktop computer, a laptop computer, personal digital assistant (PDA), an appliance, a wearable device, a camera, a tablet, or a mobile phone, etc. In one embodiment, the machine 1100 also includes a video display 1110, an alphanumeric input device 1112 (e.g., a keyboard), a cursor control device 1114 (e.g., a mouse), a drive unit 1116, a signal generation device 1118 (e.g., a speaker) and a network interface device 1120.

In one embodiment, the video display 1110 includes a touch sensitive screen for user input. In one embodiment, the touch sensitive screen is used instead of a keyboard and mouse. The disk drive unit 1116 includes a machine-readable medium 1122 on which is stored one or more sets of instructions 1124 (e.g., software) embodying any one or more of the methodologies or functions described herein. The instructions 1124 can also reside, completely or at least partially, within the main memory 1104 and/or within the processor 1102 during execution thereof by the computer system 1100. The instructions 1124 can further be transmitted or received over a network 1140 via the network interface device 1120. In some embodiments, the machine-readable medium 1122 also includes a database 1125.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory may also be a random access memory. The non-volatile memory can be a local device coupled directly to the rest of the components in the data processing system. A non-volatile memory that is remote from the system, such as a network storage device coupled to any of the computer systems described herein through a network interface such as a modem or Ethernet interface, can also be used.

While the machine-readable medium 1122 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals. The term "storage module" as used herein may be implemented using a machine-readable medium.

In general, the routines executed to implement the embodiments of the present disclosure can be implemented as part of an operating system or a specific application, component, program, object, module or sequence of instructions referred to as "programs" or "applications". For example, one or more programs or applications can be used to execute specific processes described herein. The programs or applications typically comprise one or more instructions set at various times in various memory and storage devices in the machine and that, when read and executed by one or more processors, cause the machine to perform operations to execute elements involving the various aspects of the embodiments described herein.

The executable routines and data may be stored in various places, including, for example, ROM, volatile RAM, non-volatile memory, and/or cache. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of machines, those skilled in the art will appreciate that the various embodiments are capable of being distributed as a program product in a variety of forms, and that the embodiments described herein apply equally regardless of the particular type of machine- or computer-readable media used to actually effect the distribution. Examples of machine-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", or the like means that a particular feature, design, structure, or characteristic described in connection with the embodiment is included in at least one embodiment of the disclosure. The appearances of, for example, the phrases "according to an embodiment", "in one embodiment", "in an embodiment", or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

It should also be understood that a variety of changes may be made without departing from the essence of the present disclosure. Such changes are also implicitly included in the description. They still fall within the scope of the present disclosure. It should be understood that this disclosure is intended to yield a patent covering numerous aspects of the disclosed technology, both independently and as an overall system, and in both method and apparatus modes.

Further, each of the various elements of the present disclosure and claims may also be achieved in a variety of manners. This disclosure should be understood to encompass each such variation, be it a variation of an embodiment of any apparatus embodiment, a method or process embodiment, or even merely a variation of any element of these.

What is claimed is:

1. A method for managing cybersecurity risks, comprising:
    acquiring a first set of data from a first group of data sources and a second set of data from a second group of data sources, wherein the first group of data sources comprises a plurality of network components within an energy delivery network, and the second group of data sources comprises an information technology (IT) service or system associated with the energy delivery network;
    generating, for each network component of the plurality of network components, a first metric based on the first set of data and a second metric based on the second set of data, wherein the first metric comprises a likelihood of each network component within the energy delivery network being affected by one or more cyber vulnerabilities, and the second metric comprises a calculated impact on the energy delivery network or a portion thereof due to the one or more cyber vulnerabilities, wherein generating the first metric comprises determining if a multi-step series of activities in network traffic on each network component is anomalous based at least in part on a detection of an anomalous pattern occurring in the energy delivery network and at least one indicator selected from the group consisting of:
        (a) a computed indicator; and
        (b) a rule-based indicator;
    wherein detection of the anomalous pattern occurring in the energy delivery network comprises at least one advanced behavioral indicator;
    for each network component of the plurality of network components, applying a first weight to the first metric to generate a first weighted metric and a second weight to the second metric to generate a second weighted metric, and generating a third metric comprising an overall cybersecurity risk level associated with each network component, by utilizing a machine learning process to determine how the first weighted metric and the second weighted metric are combined to generate the third metric;
    ranking the plurality of network components based on their respective third metrics to produce a ranked list of network components;
    providing the ranked list of network components to an energy provider; and
    using the ranked list of network components to prioritize examination or repair of the plurality of network components.

2. The method of claim 1, wherein the machine learning process is configured to incorporate (i) user feedback regarding the authenticity of detected cyber vulnerabilities or threats and (ii) an impact on end customers of the energy delivery network due to the cyber vulnerabilities or threats.

3. The method of claim 1, wherein the first group of data sources further comprises a supervisory control and data acquisition (SCADA) command and control service, an enterprise firewall service, a log service, an intrusion prevention service, a security information and event management service (SIEM), or an intrusion protection service.

4. The method of claim 1, wherein the first set of data comprises network traffic detected at the plurality of network components within the energy delivery network, and the detected network traffic is analyzed using a plurality of indicators to generate the first metric.

5. The method of claim 4, wherein the first metric is configured to increase upon detection of the at least one indicator selected from the group consisting of the computed indicator and the rule-based indicator.

6. The method of claim 4, further comprising:
    updating the first metric when an Internet Protocol (IP) address associated with the detected network traffic is linked to one of an illegitimate source, system, entity, and account.

7. The method of claim 4, further comprising:
    updating the first metric when one of (i) a message-digest algorithm hash value associated with the detected network traffic and (ii) a regular expression associated with the detected network traffic, matches one of a virus, malware, a Trojan horse, a spam communication, a phishing message, and a piece of junk mail.

8. The method of claim 4, further comprising:
    updating the first metric when one of (i) the multiple-step series of activities associated with the detected network traffic and (ii) a combination of multiple indicators associated with the detected network traffic is found to be atypical.

9. The method of claim 1, wherein the IT service or system comprises a customer information service, a geographic information service, a work management service, an enterprise asset management service, a customer care and billing service, an enterprise communications service, or a threat and vulnerability detection library service.

10. The method of claim 1, wherein the second set of data is associated with customer data, operations data, or economic data relating to the energy delivery network.

11. The method of claim 10, wherein the customer data, operations data, or economic data is analyzed to generate the second metric, and the second metric is configured to vary depending on changes in quantitative metrics to the customer data, operations data, or economic data.

12. The method of claim 10, wherein the customer data is associated with at least one of a customer count, an issue resolution time, a reliability index, or a customer criticality metric.

13. The method of claim 10, wherein the operations data is associated with one or more of a labor cost, a materials cost, a physical damage likelihood metric, or a degree of redundancy.

14. The method of claim 10, wherein the economic data is associated with at least one of an energy delivery cost, an equipment cost, or a regulatory penalty.

15. The method of claim 1, further comprising:
    generating first, second, and third metrics for each of the plurality of network components within the energy delivery network, each third metric indicating an overall cybersecurity risk level associated with a corresponding network component;
    ranking the plurality of network components based on their respective third metrics to produce a ranked list of network components; and
    providing at least a portion of the ranked list of network components to the energy provider that utilizes the energy delivery network.

16. The method of claim 15, further comprising:
    generating a visualization for each network component in the ranked list of network components, wherein each visualization is presented in association with a particular color determined based on at least one of a ranking for the corresponding network component or a corresponding overall level of cybersecurity risk associated with the corresponding network component.

17. The method of claim 1, wherein the energy delivery network includes at least one of an electricity delivery network, an oil delivery network, or a gas delivery network.

18. A system comprising one or more computers and one or more storage devices storing instructions that are operable, when executed by the one or more computers, to cause the one or more computers to perform operations comprising:
- acquiring a first set of data from a first group of data sources and a second set of data from a second group of data sources, wherein the first group of data sources comprises a plurality of network components within an energy delivery network, and the second group of data sources comprises an information technology (IT) service or system associated with the energy delivery network;
- generating, for each network component of the plurality of network components, a first metric based on the first set of data and a second metric based on the second set of data, wherein the first metric comprises a likelihood of each network component within the energy delivery network being affected by one or more cyber vulnerabilities, and the second metric comprises a calculated impact on the energy delivery network or a portion thereof due to the one or more cyber vulnerabilities affecting each network component, wherein generating the first metric comprises determining if a multi-step series of activities in network traffic on each network component is anomalous based at least in part on a detection of an anomalous pattern occurring in the energy delivery network and at least one indicator selected from the group consisting of:
  - (a) a computed indicator; and
  - (b) a rule-based indicator;
- wherein detection of the anomalous pattern occurring in the energy delivery network comprises at least one advanced behavioral indicator;
- for each network component of the plurality of network components, applying a first weight to the first metric to generate a first weighted metric and a second weight to the second metric to generate a second weighted metric, and generating a third metric comprising an overall cybersecurity risk level associated with each network component, by utilizing a machine learning process to determine how the first weighted metric and the second weighted metric are combined to generate the third metric;
- ranking the plurality of network components based on their respective third metrics to produce a ranked list of network components;
- providing the ranked list of network components to an energy provider; and
- using the ranked list of network components to prioritize examination or repair of the plurality of network components.

19. One or more non-transitory computer storage media storing instructions that are operable, when executed by one or more computers, to cause the one or more computers to perform operations comprising:
- acquiring a first set of data from a first group of data sources and a second set of data from a second group of data sources, wherein the first group of data sources comprises a plurality of network components within an energy delivery network, and the second group of data sources comprises an information technology (IT) service or system associated with the energy delivery network;
- generating, for each network component of the plurality of network components, a first metric based on the first set of data and a second metric based on the second set of data, wherein the first metric comprises a likelihood of each network component within the energy delivery network being affected by one or more cyber vulnerabilities, and the second metric comprises a calculated impact on the energy delivery network or a portion thereof due to the one or more cyber vulnerabilities affecting each network component, wherein generating the first metric comprises determining if a multi-step series of activities in network traffic on each network component is anomalous based at least in part on a detection of an anomalous pattern occurring in the energy delivery network and at least one indicator selected from the group consisting of:
  - (a) a computed indicator; and
  - (b) a rule-based indicator;
- wherein detection of the anomalous pattern occurring in the energy delivery network comprises at least one advanced behavioral indicator;
- for each network component of the plurality of network components, applying a first weight to the first metric to generate a first weighted metric and a second weight to the second metric to generate a second weighted metric, and generating a third metric comprising an overall cybersecurity risk level associated with each network component, by utilizing a machine learning process to determine how the first weighted metric and the second weighted metric are combined to generate the third metric;
- ranking the plurality of network components based on their respective third metrics to produce a ranked list of network components;
- providing the ranked list of network components to an energy provider; and
- using the ranked list of network components to prioritize examination or repair of the plurality of network components.

* * * * *